US012562983B2

(12) United States Patent
Dukes

(10) Patent No.: US 12,562,983 B2
(45) Date of Patent: Feb. 24, 2026

(54) SERVICE ROUTING USING IP ENCAPSULATION

(71) Applicant: Cisco Technology, Inc., San Jose, CA (US)

(72) Inventor: Darren Russell Dukes, Ottawa (CA)

(73) Assignee: Cisco Technology, Inc., San Jose, CA (US)

( * ) Notice: Subject to any disclaimer, the term of this patent is extended or adjusted under 35 U.S.C. 154(b) by 127 days.

(21) Appl. No.: 18/470,136

(22) Filed: Sep. 19, 2023

(65) Prior Publication Data

US 2025/0097148 A1 Mar. 20, 2025

(51) Int. Cl.
| | |
|---|---|
| *H04L 45/741* | (2022.01) |
| *H04L 9/40* | (2022.01) |
| *H04L 45/42* | (2022.01) |
| *H04L 45/64* | (2022.01) |

(52) U.S. Cl.
CPC .............. *H04L 45/42* (2013.01); *H04L 45/64* (2013.01); *H04L 45/741* (2013.01); *H04L 63/20* (2013.01)

(58) Field of Classification Search
None
See application file for complete search history.

(56) References Cited

U.S. PATENT DOCUMENTS

| | | | | |
|---|---|---|---|---|
| 9,525,627 | B2 * | 12/2016 | Padgett ................... | H04L 45/16 |
| 10,084,697 | B2 * | 9/2018 | Judge ................... | H04L 41/122 |
| 10,367,730 | B2 * | 7/2019 | Dunbar ............... | H04L 12/4641 |
| 10,652,320 | B2 * | 5/2020 | Gandhi ................... | H04L 45/74 |
| 10,659,346 | B2 * | 5/2020 | Usman ................. | H04L 45/124 |
| 10,757,231 | B2 * | 8/2020 | Filsfils ................ | H04L 61/5007 |
| 11,496,589 | B2 * | 11/2022 | Jain ........................ | H04L 67/562 |
| 2006/0029076 | A1 | 2/2006 | Namihira et al. | |
| 2007/0147363 | A1 * | 6/2007 | Oswal ................... | H04L 69/161 370/389 |
| 2007/0274321 | A1 * | 11/2007 | Jonsson ............. | H04L 12/2856 370/395.53 |
| 2009/0257439 | A1 * | 10/2009 | Xu .......................... | H04L 45/04 370/389 |
| 2010/0098072 | A1 * | 4/2010 | Satterlee ............... | H04L 47/125 370/389 |

(Continued)

FOREIGN PATENT DOCUMENTS

| | | | | |
|---|---|---|---|---|
| WO | WO-2004054203 A1 * | 6/2004 | ............. | H04L 29/06 |

*Primary Examiner* — Sandarva Khanal
(74) *Attorney, Agent, or Firm* — Polsinelli P.C.

(57) ABSTRACT

Described herein are techniques directed to utilizing IP encapsulation to route data packets to different instances of a service in a network. In one aspect, a method includes generating a first request, which includes a first data packet and a first IP encapsulation; transmitting the first request to a service aware router, wherein the service aware router generates a second request that includes the first data packet and a second IP encapsulation, and transmits the service request to the instance of the service; receiving, from the service instance, a response including a second data packet and a third IP encapsulation, which includes an identifier of the service instance of the service; and recording the identifier of the service instance, wherein subsequent requests for applying the service to data packets originating at the device are directly transmitted by the device to the service instance.

20 Claims, 7 Drawing Sheets

(56) References Cited

U.S. PATENT DOCUMENTS

| | | | |
|---|---|---|---|
| 2011/0113236 A1* | 5/2011 | Chenard | H04L 63/0485 |
| | | | 713/154 |
| 2013/0287026 A1* | 10/2013 | Davie | H04L 12/4641 |
| | | | 370/392 |
| 2014/0092751 A1* | 4/2014 | Meilik | H04L 41/0213 |
| | | | 370/241.1 |
| 2015/0124821 A1* | 5/2015 | Chu | H04L 45/16 |
| | | | 370/392 |
| 2015/0200806 A1* | 7/2015 | Donley | H04L 61/5014 |
| | | | 370/392 |
| 2016/0105499 A1* | 4/2016 | Kumar | H04L 61/2521 |
| | | | 709/226 |
| 2017/0053258 A1* | 2/2017 | Carney | H04L 45/22 |
| 2017/0099188 A1* | 4/2017 | Chang | H04L 63/20 |
| 2017/0230276 A1* | 8/2017 | Ceccarelli | H04L 45/64 |
| 2018/0026873 A1* | 1/2018 | Cheng | H04L 61/2514 |
| | | | 709/239 |
| 2020/0252366 A1* | 8/2020 | Zhang | H04L 61/5046 |
| 2021/0083972 A1* | 3/2021 | Niu | H04L 45/74 |
| 2022/0200891 A1* | 6/2022 | Keeler | H04L 45/122 |
| 2023/0116163 A1 | 4/2023 | Scholz et al. | |

* cited by examiner

HOST (H) ACCESSES SERVICE AT SA VIA A KNOWN SAR

HOST (H) ACCESSES SERVICE (SA) DIRECTLY

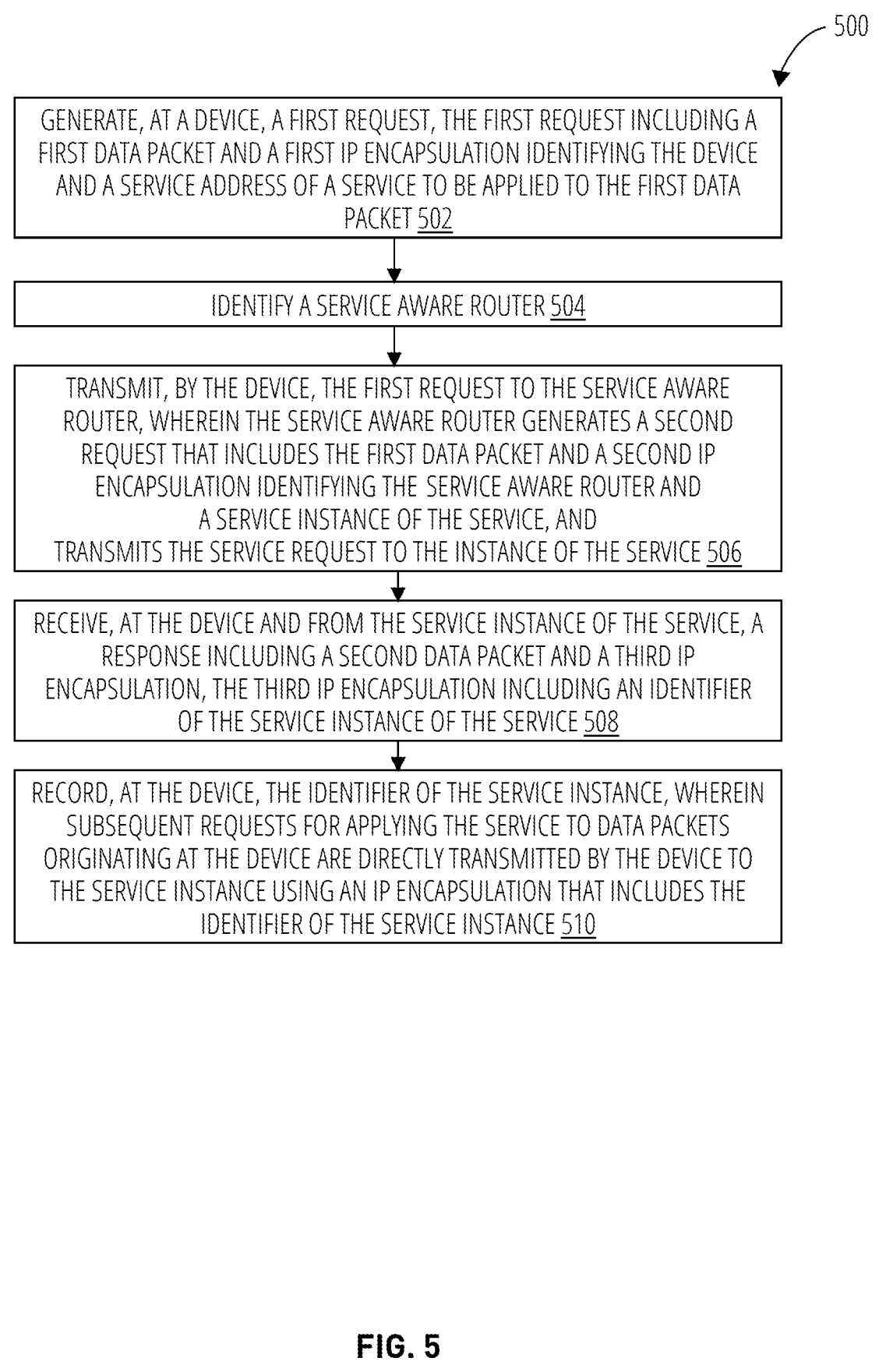

500

GENERATE, AT A DEVICE, A FIRST REQUEST, THE FIRST REQUEST INCLUDING A FIRST DATA PACKET AND A FIRST IP ENCAPSULATION IDENTIFYING THE DEVICE AND A SERVICE ADDRESS OF A SERVICE TO BE APPLIED TO THE FIRST DATA PACKET 502

IDENTIFY A SERVICE AWARE ROUTER 504

TRANSMIT, BY THE DEVICE, THE FIRST REQUEST TO THE SERVICE AWARE ROUTER, WHEREIN THE SERVICE AWARE ROUTER GENERATES A SECOND REQUEST THAT INCLUDES THE FIRST DATA PACKET AND A SECOND IP ENCAPSULATION IDENTIFYING THE SERVICE AWARE ROUTER AND A SERVICE INSTANCE OF THE SERVICE, AND TRANSMITS THE SERVICE REQUEST TO THE INSTANCE OF THE SERVICE 506

RECEIVE, AT THE DEVICE AND FROM THE SERVICE INSTANCE OF THE SERVICE, A RESPONSE INCLUDING A SECOND DATA PACKET AND A THIRD IP ENCAPSULATION, THE THIRD IP ENCAPSULATION INCLUDING AN IDENTIFIER OF THE SERVICE INSTANCE OF THE SERVICE 508

RECORD, AT THE DEVICE, THE IDENTIFIER OF THE SERVICE INSTANCE, WHEREIN SUBSEQUENT REQUESTS FOR APPLYING THE SERVICE TO DATA PACKETS ORIGINATING AT THE DEVICE ARE DIRECTLY TRANSMITTED BY THE DEVICE TO THE SERVICE INSTANCE USING AN IP ENCAPSULATION THAT INCLUDES THE IDENTIFIER OF THE SERVICE INSTANCE 510

FIG. 5

SERVICE ROUTING USING IP ENCAPSULATION

TECHNICAL FIELD

The present technology pertains to service chaining and, more specifically, to routing data packets to different service instances using IP encapsulation that provides a mapping between a service address and a particular instance of that service.

BACKGROUND

A service is represented by an Internet Protocol (IP) address and is comprised of one or more service instances for performing an underlying service/function in a communication network. Examples of a service may include a firewall service, an intrusion detection service, etc. Different instances of a service may be available/reachable over one or more cloud providers. A service can be reachable via a load balancer and a set of service instances for scalability and redundancy. Service instance selection occurs at the load balancer for every service request. Hosts consuming services are unaware of the service instance in use and the load balancer is involved in every transaction.

BRIEF DESCRIPTION OF THE SEVERAL VIEWS OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 5 illustrates an example flowchart for routing data packets to service instances using IP encapsulation according to aspects of the present disclosure.

DETAILED DESCRIPTION

Figure 1:
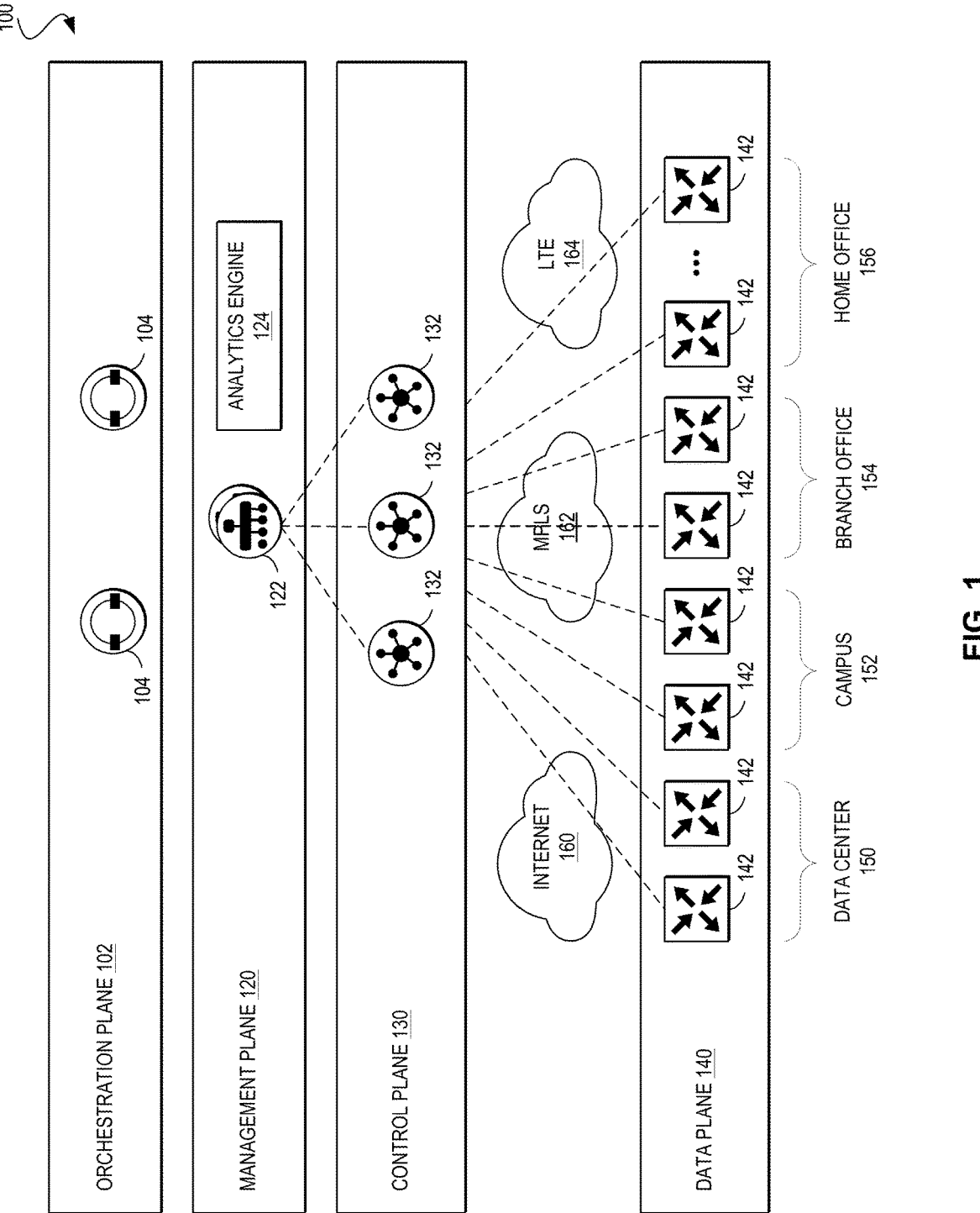
FIG. 1 illustrates an example of a high-level network architecture according to some aspects of the present disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

A used herein the term "configured" shall be considered to interchangeably be used to refer to configured and configurable, unless the term "configurable" is explicitly used to distinguish from "configured". The proper understanding of the term will be apparent to persons of ordinary skill in the art in the context in which the term is used.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Aspects of the present disclosure can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

The methods disclosed herein describe a system and method of routing data packets to different service instances using IP encapsulation that provides a mapping between a service address and a particular instance of that service. As will be described in more detail below. The data packets may be routed from a user device to a service instance associated with a particular service using IPv4 or IPv6 encapsulation. The routing may be performed without additional tunneling or extension headers. A device and a service aware router may facilitate the routing through a public or private network.

In one aspect, a method includes generating, at a device, a first request, the first request including a first data packet and a first IP encapsulation identifying the device and a service address of a service to be applied to the first data packet; transmitting, by the device, the first request to a service aware router, wherein the service aware router generates a second request that includes the first data packet and a second IP encapsulation identifying the service aware router and a service instance of the service, and transmits the service request to the instance of the service; receiving, at the device and from the service instance of the service, a response including a second data packet and a third IP encapsulation, the third IP encapsulation including an identifier of the service instance of the service; and recording, at the device, the identifier of the service instance, wherein subsequent requests for applying the service to data packets originating at the device are directly transmitted by the device to the service instance using an IP encapsulation that includes the identifier of the service instance.

In another aspect, the second request includes the first IP encapsulation compressed by the service aware router, whereby when received by the service instance, the service instance reconstructs the first IP encapsulation.

In another aspect, the service aware router applies a security mechanism to the first IP encapsulation.

In another aspect, the service aware router is identified via out-of-band signaling, and wherein a shim layer maps, at the device, the service address to the service aware router identified via the out-of-band signaling.

In another aspect, any one of the first IP encapsulation, the second IP encapsulation, the third IP encapsulation, and the IP encapsulation of the subsequent requests can be one of an IPv4 encapsulation and an IPv6 encapsulation.

In another aspect, the service instance is an instance of the service stored in a public or private cloud.

In another aspect, a method of software-defined networking (SDN) mapping is used to implement a mechanism of service address to service instance mapping at the service aware router.

In one aspect, a device includes one or more memories configured to store computer-readable instructions and one or more processors. The one or more processors are configured to execute the computer-readable instructions to generate a first request, the first request including a first data packet and a first IP encapsulation identifying the device and a service address of a service to be applied to the first data packet; transmit the first request to a service aware router, wherein the service aware router generates a second request that includes the first data packet and a second IP encapsulation identifying the service aware router and a service instance of the service, and transmits the service request to the instance of the service; receive, from the service instance of the service, a response including a second data packet and a third IP encapsulation, the third IP encapsulation including an identifier of the service instance of the service; and record the identifier of the service instance, wherein subsequent requests for applying the service to data packets originating at the device are directly transmitted by the device to the service instance using an IP encapsulation that includes the identifier of the service instance.

In one aspect, one or more non-transitory computer-readable storage media include computer-readable instructions, which when executed by one or more processors of a network device, causes the network device to generate a first request, the first request including a first data packet and a first IP encapsulation identifying the device and a service address of a service to be applied to the first data packet; transmit the first request to a service aware router, wherein the service aware router generates a second request that includes the first data packet and a second IP encapsulation identifying the service aware router and a service instance of the service, and transmits the service request to the instance of the service; receive, from the service instance of the service, a response including a second data packet and a third IP encapsulation, the third IP encapsulation including an identifier of the service instance of the service; and record the identifier of the service instance, wherein subsequent requests for applying the service to data packets originating at the device are directly transmitted by the device to the service instance using an IP encapsulation that includes the identifier of the service instance.

Example Embodiments

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

As noted above, different instances of a service may be reachable via a load balancer on different cloud service providers. The load balancer can select a service instance for every service request received. The load balancer may be a router. The load balancer is involved in every service request. In lieu of a load balancer, a service aware router may be incorporated into the network. The service aware router is capable of routing service requests to appropriate service instances. The service aware router may route service requests to service instances using one or more methods, including tunneling, extension headers, and, as mentioned herein, IP encapsulation.

IP encapsulation is the process of adding headers to data at each layer of a particular protocol stack. When data has to be sent from one host (e.g., a user device) on a network to another host, the process of encapsulation is used to add a header in front of the data at each layer of the protocol stack in descending order. The header must contain a data field that indicates the type of data encapsulated at the layer immediately above the current layer. As the packet ascends the protocol stack on the receiving side of the network, each encapsulation header is removed in reverse order.

The disclosed technology addresses the need in the art for a service aware routing system based on IP encapsulation to map a service address to a service instance. Service aware routers may route service requests to a service instance of one or more service instances via tunneling, extension headers, IP encapsulation, and/or a similar method of mapping service requests. Tunneling generally requires a large amount of infrastructure to operate and the tunneling overhead and obfuscation is cumbersome. Thus, basic tunneling is expensive to implement on existing systems. IP encapsulation can be implemented on most existing networks using existing infrastructure, therefore being a cost-effective solution for routing data packets to service instances. The use of extension headers is also not ideal for a network, due to associated complexities for hosts. Additionally, extension headers require the host to know service aware routers and does not allow for dynamic discovery of service aware routers out-of-band. Additionally, end-to-end security in a network that utilizes extension headers cannot be guaranteed due to the swapping of source and destination addresses within the service request packet by the service aware router. IP encapsulation supports security efforts of a network by ensuring end-to-end security. IP encapsulation supports various types of encryption (e.g., Internet Protocol Security (IPsec) and transport layer security (TLS)) between endpoints and at intermediate endpoints.

FIG. 1 illustrates an example of a high-level network architecture according to some aspects of the present disclosure. An example of an implementation of the network architecture 100 is the Cisco® SD-WAN architecture. However, one of ordinary skill in the art will understand that, for the network architecture 100 and any other system discussed in the present disclosure, there can be additional or fewer component in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure.

In this example, the network architecture 100 can comprise an orchestration plane 102, a management plane 120, a control plane 130, and a data plane 140. The orchestration plane can 102 assist in the automatic on-boarding of edge network devices 142 (e.g., switches, routers, etc.) in an overlay network. The orchestration plane 102 can include one or more physical or virtual network orchestrator appliances 104. The network orchestrator appliance(s) 104 can perform the initial authentication of the edge network devices 142 and orchestrate connectivity between devices of the control plane 130 and the data plane 140. In some embodiments, the network orchestrator appliance(s) 104 can also enable communication of devices located behind Network Address Translation (NAT). In some embodiments, physical or virtual Cisco® SD-WAN vBond appliances can operate as the network orchestrator appliance(s) 104.

The management plane 120 can be responsible for central configuration and monitoring of a network. The management plane 120 can include one or more physical or virtual network management appliances 122 and an analytics engine 124. In some embodiments, the network management appliance(s) 122, using analytics engine 124, can provide centralized management of the network via a graphical user interface to enable a user to monitor, configure, and maintain the edge network devices 142 and links (e.g., Internet transport network 160, MPLS network 162, 4G/LTE network 164) in an underlay and overlay network. Analytics engine 124 can collect and provide various analytics on operation of network 100 and any components thereof. Output of analytics engine 124 can then be used by network appliance(s) 122 to automatically monitor, configure and/or maintain operations of network 100 and/or enable a user to do the same. The network management appliance(s) 122 can support multi-tenancy and enable centralized management of logically isolated networks associated with different entities (e.g., enterprises, divisions within enterprises, groups within divisions, etc.). Alternatively or in addition, the network management appliance(s) 122 can be a dedicated network management system for a single entity. In some embodiments, physical or virtual Cisco® SD-WAN vManage appliances can operate as the network management appliance(s) 122.

The control plane 130 can build and maintain a network topology and make decisions on where traffic flows. The control plane 130 can include one or more physical or virtual network controller appliance(s) 132. The network controller appliance(s) 132 can establish secure connections to each network device 142 and distribute route and policy information via a control plane protocol (e.g., Overlay Management Protocol (OMP) (discussed in further detail below), Open Shortest Path First (OSPF), Intermediate System to Intermediate System (IS-IS), Border Gateway Protocol (BGP), Protocol-Independent Multicast (PIM), Internet Group Management Protocol (IGMP), Internet Control Message Protocol (ICMP), Address Resolution Protocol (ARP), Bidirectional Forwarding Detection (BFD), Link Aggregation Control Protocol (LACP), etc.). In some embodiments, the network controller appliance(s) 132 can operate as route reflectors. The network controller appliance(s) 132 can also orchestrate secure connectivity in the data plane 140 between and among the edge network devices 142. For example, in some embodiments, the network controller appliance(s) 132 can distribute crypto key information among the network device(s) 142. This can allow the network to support a secure network protocol or application (e.g., Internet Protocol Security (IPSec), Transport Layer Security (TLS), Secure Shell (SSH), etc.) without Internet Key Exchange (IKE) and enable scalability of the network. In some embodiments, physical or virtual Cisco® SD-WAN vSmart controllers can operate as the network controller appliance(s) 132.

The data plane 140 can be responsible for forwarding packets based on decisions from the control plane 130. The data plane 140 can include the edge network devices 142, which can be physical or virtual network devices. The edge network devices 142 can operate at the edges various network environments of an organization, such as in one or more data centers or colocation centers 150, campus networks 152, branch office networks 154, home office networks 156, and so forth, or in the cloud (e.g., Infrastructure as a Service (IaaS), Platform as a Service (PaaS), SaaS, and other cloud service provider networks). The edge network devices 142 can provide secure data plane connectivity among sites over one or more WAN transports, such as via one or more Internet transport networks 160 (e.g., Digital Subscriber Line (DSL), cable, etc.), MPLS networks 162 (or other private packet-switched network (e.g., Metro Ethernet, Frame Relay, Asynchronous Transfer Mode (ATM), etc.), mobile networks 164 (e.g., 3G, 4G/LTE, 5G, etc.), or other WAN technology (e.g., Synchronous Optical Networking (SONET), Synchronous Digital Hierarchy (SDH), Dense Wavelength Division Multiplexing (DWDM), or other fiber-optic technology; leased lines (e.g., T1/E1, T3/E3, etc.); Public Switched Telephone Network (PSTN), Integrated Services Digital Network (ISDN), or other private circuit-switched network; small aperture terminal (VSAT) or other satellite network; etc.). The edge network devices 142 can be responsible for traffic forwarding, security, encryption, quality of service (QOS), and routing (e.g., BGP, OSPF, etc.), among other tasks. In some embodiments, physical or virtual Cisco® SD-WAN vEdge routers can operate as the edge network devices 142.

Figure 2:
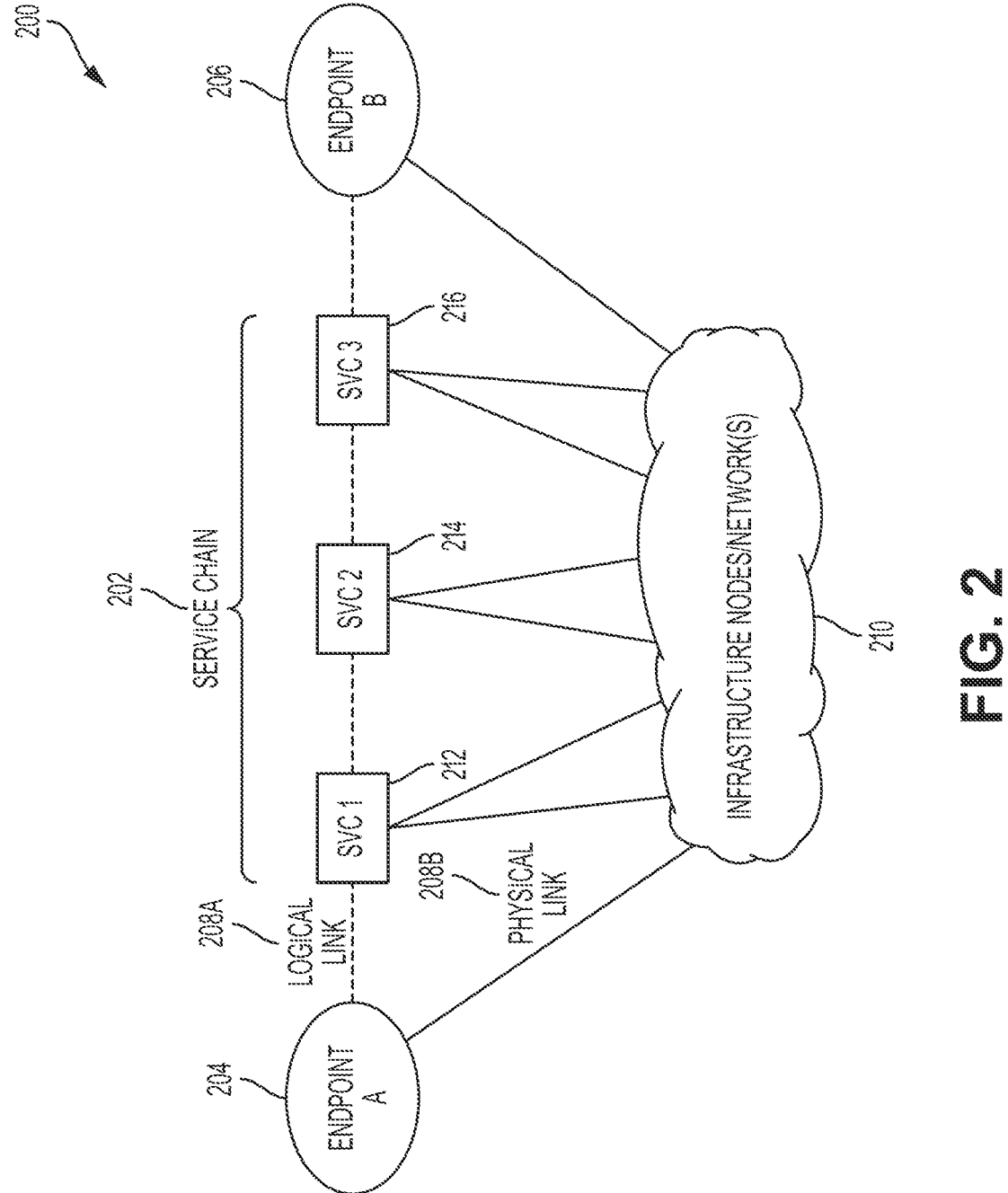
FIG. 2 illustrates a block diagram of an example service chain configuration for application traffic according to some aspects of the present disclosure.

FIG. 2 illustrates a block diagram of an example service chain configuration for application traffic according to some aspects of the present disclosure. In example configuration 200, a service chain 202 is configured to process traffic between endpoint 204 and endpoint 206. Endpoint 204 can include any device or server (physical and/or virtual) on a network, such as a cloud consumer network (e.g., a private cloud or on-premises site), and endpoint 206 can include any device or server (physical and/or virtual) on a different network, such as a public cloud. For example, endpoint 204 can be an application or server on a private cloud and endpoint 206 can be an application or server on a public cloud.

Service chain 202 includes service applications 212, 214, 216, which may be configured to apply specific L4 (Layer 4) through L7 (Layer 7) policies to traffic between endpoint 204 and endpoint 206. Service applications 212, 214, 216 can be implemented via respective virtual machines (VMs), software containers, servers, nodes, clusters of nodes, data centers, etc. Example service applications (212, 214, 216) include, without limitations, firewalls, Intrusion Detection Systems (IDS), Intrusion Detection Systems (IDS), WAN Optimizers, Network Address Translation (NAT) systems, virtual routers/switches, load balancers, Virtual Private Network (VPN) gateways, data loss prevention (DLP) systems, web application firewalls (WAFs), application delivery controllers (ADCs), packet capture appliances, secure sockets layer (SSL) appliances, adaptive security appliances (ASAs), etc.

Service applications 212, 214, 216 in service chain 202 are interconnected via a logical link 208A, which is supported by a physical link 208B through physical infrastructure 210. Physical infrastructure 210 can include one or more networks, nodes, data centers, clouds, hardware resources, physical locations, etc. Traffic from endpoint 204 can be routed to physical infrastructure 210 through physical link 208B, and redirected by physical infrastructure 210 along logical link 208A and through service chain 202.

As noted above, one or more aspects of the present disclosure are directed to providing a single hierarchical construct for defining requirements of a service in a service chain. As will be described in more detail below. Such hierarchical construct would include multiple levels of objections including at least one High Availability (HA) pair, an attachment handle for each HA pair, and an atom defining transmission and reception interfaces for the attachment handle.

Typically, for a service in a SC, the following requirements must be met: (1) Allow tracking of services; (2) Deterministic Failover: Allow a service to have an active path and a deterministic backup path for every active path; (3) Allow active paths and backup paths to be sourced from independent service instances; (4) Load-Balancing: Allow traffic to be load-balanced across various service instances; (5) Allow traffic to be transmitted to and received from a service instance over separate interfaces; (6) Allow service facing interfaces to be physical interfaces or sub-interfaces interfaces or tunnel interfaces; (7) Allow connecting to services that are IPv4-only, IPv6 only, and/or are dual stack (IPv4 and IPv6); and (8) Allow tunnels to carry both IPv6 and IPv4 traffic and be able to use any type of tunnel or transport interfaces.

Figure 3:
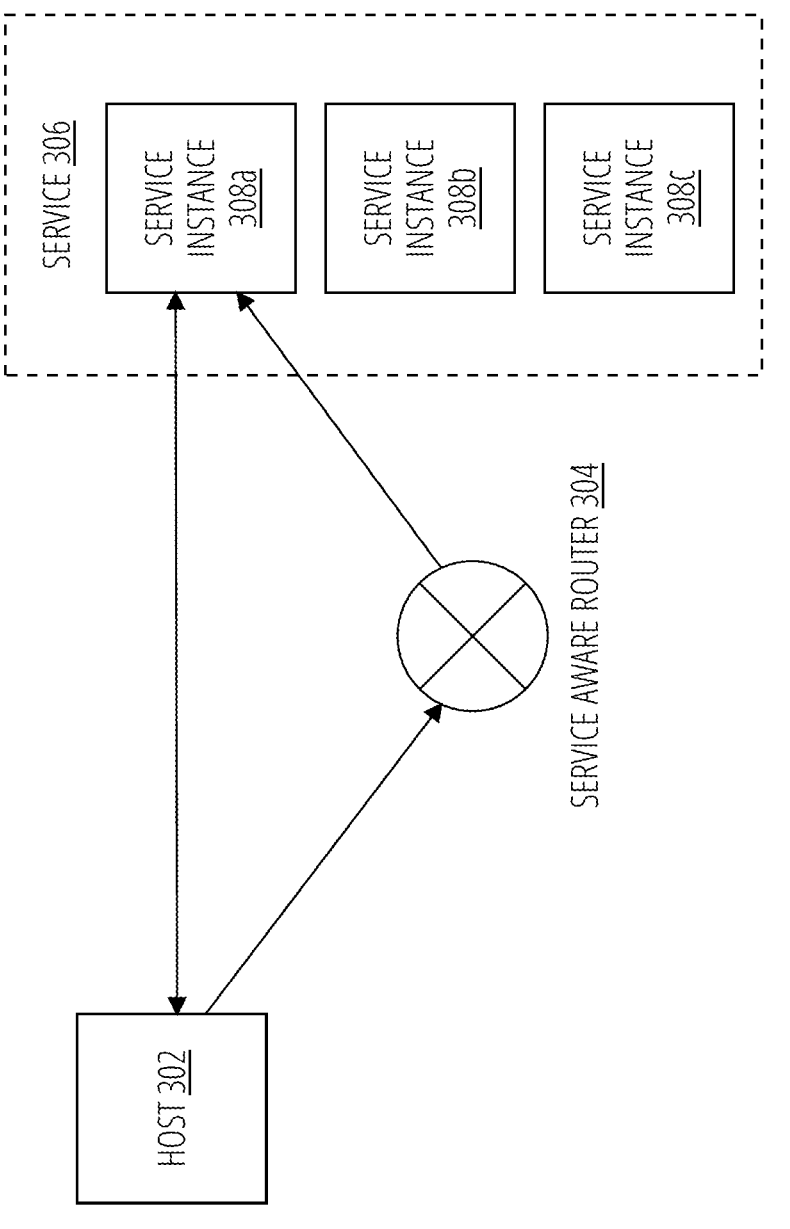
FIG. 3 illustrates an example block diagram illustrating a system for routing data packets to service instances using IP encapsulation according to aspects of the present disclosure.

FIG. 3 illustrates an example block diagram illustrating a system for routing data packets to service instances using IP encapsulation according to aspects of the present disclosure. Example system 300 of FIG. 3 may be implemented in example networks of FIGS. 1 and 2. The block diagram may illustrate an example relationship between host 302, service aware router 304, service 306, and respective service instances (e.g., service instance 308a, service instance 308b, and service instance 308c). Host 302 and service aware router 304 may be associated with a particular network. In some examples, the network may be a private network associated with an enterprise and/or may be a public network such as non-limiting example networks of FIGS. 1 and 2. Service 306 may be hosted on one or more cloud providers and/or data centers associated with the network. For example, service instance 308a, service instance 308b, and service instance 308c may be hosted on the same cloud provider or may be hosted on one or more different cloud providers. Service 306 may only be reachable via a service instance (e.g., service instance 308a, service instance 308b, and service instance 308c).

Host 302 may be an originator of network traffic. For example, host 302 may be a hardware device that has the capability of permitting access to a network via a user interface, specialized software, network address, protocol stack, or any other means. Host 302 may be a client and/or a server device associated with the network, such as endpoint 204 and/or endpoint 206 as described in FIG. 2 which may be associated with non-limiting example networks of FIGS. 1 and 2. In some examples, host 302 may be a user device connected to the network. For example, host 302 may be a laptop, desktop computer, mobile phone, smartphone, tablet, IoT device, or the like.

In some examples, host 302 may receive a command (e.g., from a network administrator, associated user, another host device, etc.) to access service 306. Alternatively, a service may be automatically applied to a given network traffic and associated data packets depending on the nature of a particular network traffic. Service 306 may be an application at a network application layer that connects one or more users working in one or more locations to applications and data in a network. For example, service 306 may be a network security service, a firewall service, an intrusion detection service, and/or any other known or to be developed service within a given network. In some examples, service 306 may be accessible through one or more service instances (e.g., service instance 308a, service instance 308b, and service instance 308c). A service instance may be a single instantiation of service 306 that runs the workload. The service instance may be hosted on a cloud provider, private cloud, data center, etc. The one or more services instances may be associated with different IP addresses than service 306.

In some examples, the host 302 may send a data packet to service 306, wherein service 306 is associated with a service address (SA). The data packet may be illustrated in the format as follows: (source1, destination1) (payload). A data packet with IP encapsulation may be illustrated in the format as follows: (source1, destination1) (source2, destination2) (payload). In some examples, host 302 (H) may send the data packet directly to service 306, such that the data packet may be illustrated as follows: (H, SA) (payload), where 'H' is the identifier/address of host 302 and 'SA' is the service address of service 306. The network may identify the data packet and route the data packet to service aware router 304 (SAR). The data packet may be routed to service aware router 304 via a method of mapping that is responsive enough to deliver relevant metrics (e.g., border gateway protocol (BGP) and/or another software-defined networking (SDN) method of mapping).

In some examples, host 302 may learn service aware router 304 via an out-of-band mechanism (e.g., domain name system (DNS) and/or dynamic host configuration protocol (DHCP)). In this example, a shim layer may perform IP encapsulation on the data packet, illustrated as follows: (H, SAR) (H, SA) (payload). The shim layer may map the service address associated with service 306 to service aware router 304 at host 302. The encapsulation performed by the shim layer may be IPv4 and/or IPv6 encapsulation.

Service aware router 304 may receive the data packet from host 302. Service aware router 304 may identify a service instance (SI) (e.g., service instance 308a, service instance 308b, and service instance 308c) associated with service 306 associated with the data packet. Service aware router 304 may forward the data packet to the service instance. In some examples, service aware router 304 may perform a second IP encapsulation on the data packet prior to forwarding the data packet to the service instance. For example, the data packet may be modified as follows: (SAR, SI) (H, SA) (payload). In some examples, service aware router 304 may compress the first IP encapsulation and/or the data packet associated with the first IP encapsulation and include the compressed IP encapsulation and/or the data packet in the second IP encapsulation. Service aware router 304 may compress the first IP encapsulation and/or the data packet in a manner that may be received by the service instance. Upon receipt of the compressed first IP encapsulation and/or the data packet, the service instance may reconstruct and/or decompress the first IP encapsulation and/or the data packet. In some examples, service aware router 304 may apply a security mechanism, encryption, and/or another security protocol to the first IP encapsulation and/or the data packet before performing the second IP encapsulation. As shown in FIG. 3, service aware router 304 may forward the data packet to service instance 308a.

Service instance 308a may receive the data packet, including the payload, and respond directly to host 302. Service instance 308a may perform a third IP encapsulation and send a second packet to host 302, which may be illustrated as follows: (SA, H) (SI, H) (payload). When received by host 302, host 302 may process the second packet and a shim layer (e.g., the aforementioned shim layer and/or a second shim layer) may update a service 306-to-service instance 308a mapping at host 302. In some examples, processing may include decompressing and/or reconstructing the first IP encapsulation and/or the data packet. Host 302 may receive the payload from service instance 308a. Using the second packet, host 302 may modify subsequent service requests intended for service 306 to be sent to service instance 308a. A subsequent service request may be illustrated as follows: (H, SI) (payload). In response to the subsequent service request, service instance 308a may response to host 302 as follows: (SI, H) (payload).

In some examples, service instance 308a may incur one or more connectivity issues, resulting in failed direct communications to host 302. Host 302 may initiate a transaction with service aware router 304 to identify a second service instance associated with service 306. For example, after the failure of service instance 308a, service aware router 304 may route network traffic from host 302 to service instance 308b.

Figure 4A:
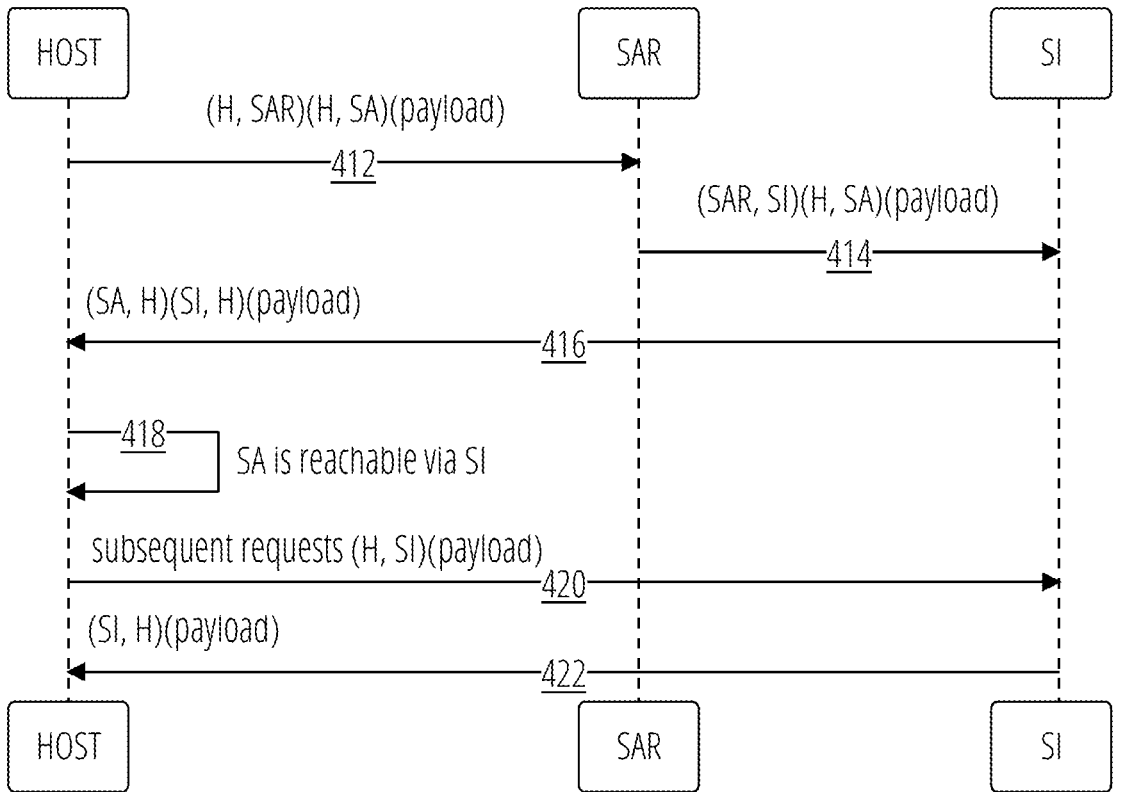
FIG. 4A illustrates an example process illustrating a system for routing data packets to a service instance according to aspects of the present disclosure.

FIG. 4A illustrates an example process illustrating a system for routing data packets to a service instance according to aspects of the present disclosure. The system described in FIG. 4A comprises a host (e.g., host 302 as described in FIG. 3), a service aware router (SAR) (e.g., service aware router 304 as described in FIG. 3), and a service instance (SI) (e.g., service instance 308a, service instance 308b, or service instance 308c as described in FIG. 3), wherein the service instance is associated with a service (e.g., service 306 as described in FIG. 3) of a service address (SA). The host, the SAR, and/or the SI may be associated with network. The network may be a public network and/or may be a private network, such as non-limiting example networks of FIGS. 1 and 2.

At step 412, the host sends a service request to the SA. The service request may be in the form of a data packet. In some examples, a shim layer associated with the host may encapsulate the address of a known SAR within the data packet. The SAR may be discovered via an out-of-band mechanism (e.g., DNS and/or DHCP). With this data, the shim layer may perform a first IP encapsulation. The first IP encapsulation may include the original address directed to the SA and a new address directed to the SAR. This may be illustrated as follows: (H, SAR) (H, SA) (payload). The SAR may receive the data packet from the host.

At step 414, the SAR forwards the data packet to the SI. The SAR may receive the data packet from the host and determine an appropriate SI associated with the service indicated by the SA. The SI may be determined by one or more load balancing methods, including, but not limited to, round-robin, IP hash, least connections, least response time, least bandwidth, etc. The mechanism of SA to SI mapping and distribution to the SAR may be completed by a method of SDN mapping (e.g., BGP) or another method responsive enough to deliver SI state and other metrics to the SAR. The SAR may perform a second IP encapsulation on the data packet. In some examples, the SAR may compress the first IP encapsulation and/or the data packet associated with the first IP encapsulation and include the compressed IP encapsulation and/or the data packet in the second IP encapsulation. The SAR may compress the first IP encapsulation and/or the data packet in a manner that may be received by the service instance. Upon receipt of the compressed first IP encapsulation and/or the data packet, the SI may reconstruct and/or decompress the first IP encapsulation and/or the data packet. In some examples, the SAR may apply a security mechanism, encryption, and/or another security protocol to the first IP encapsulation and/or the data packet before performing the second IP encapsulation. The second IP encapsulation may include the original address directed to the SA and a new address directed to the SI selected by the SAR. This may be illustrated as follows: (SAR, SI) (H, SA) (payload). The SI may receive the data packet from the SAR. In some examples, the SI may decompress and/or reconstruct the first IP encapsulation and/or the data packet.

At step 416, the SI responds to the host with a second data packet. The SI may respond directly to the host, as opposed to routing the second data packet through the SAR. The SI may perform a third IP encapsulation and send the second data packet to the host, which may include the SA and the SI. This may be illustrated as follows: (SA, H) (SI, H) (payload). The host may receive the second data packet from the SI.

At step 418, the host learns the SI. Using the second data packet, the host may learn the SI. A shim layer may update the SA-to-SI mapping; and one or more subsequent service requests may be sent directly to the SI, in lieu of utilizing the SAR as an intermediary.

At step 420, the host sends subsequent requests to the SI instead of the SA. Subsequent requests may be formatted as follows: (H. SI) (payload). In some examples, the SI may be unable to receive one or more subsequent requests from the host (e.g., power failure, connectivity failure, cloud provider issues, etc.). The host may initiate a transaction with the SAR to identify a second SI to service the one or more subsequent requests.

At step 422, the SI responds to the host. The response to the host may be formatted as follows: (SI, H) (payload).

Figure 4B:
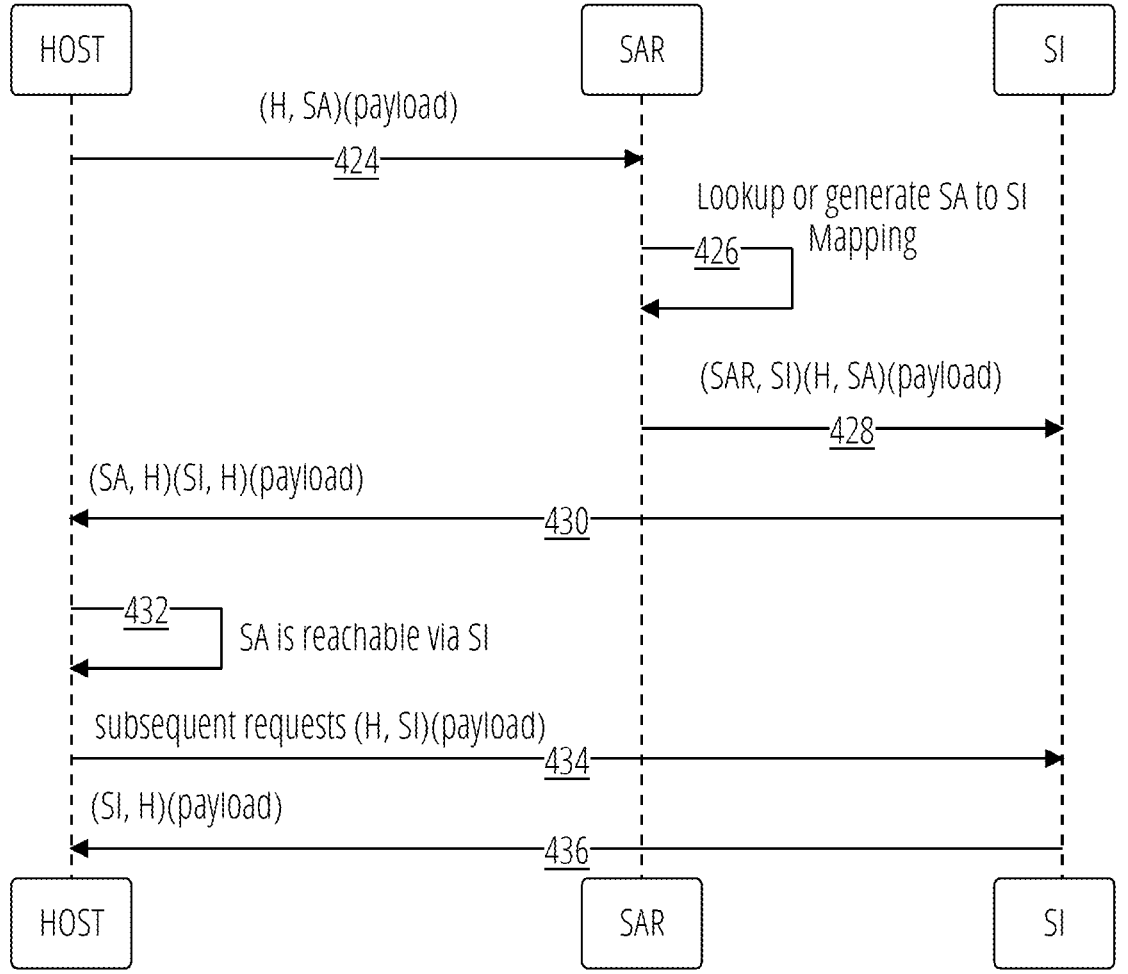
FIG. 4B illustrates an example process illustrating a system for routing data packets to a service instance according to aspects of the present disclosure.

FIG. 4B illustrates an example process illustrating a system for routing data packets to a service instance according to aspects of the present disclosure. The system described in FIG. 4A comprises a host (e.g., host 302 as described in FIG. 3), a service aware router (SAR) (e.g., service aware router 304 as described in FIG. 3), and a service instance (SI) (e.g., service instance 308*a*, service instance 308*b*, or service instance 308*c* as described in FIG. 3), wherein the service instance is associated with a service (e.g., service 306 as described in FIG. 3) of a service address (SA). The host, the SAR, and/or the SI may be associated with network. The network may be a public network and/or may be a private network, such as non-limiting example networks of FIGS. 1 and 2.

At step 424, the host sends a service request to the SA. The service request may be in the form of a data packet. In some examples, the data packet may be sent directly to the SA, which may be illustrated in the format as follows: (H, SA) (payload). In that circumstance, the network may detect the data packet and may redirect it to the SAR automatically. The SAR may receive the data packet from the host.

At step 426, the SAR may generate SA to SI mapping. The mechanism of SA to SI mapping and distribution to the SAR may be completed by a method of SDN mapping (e.g., BGP) or another method responsive enough to deliver SI state and other metrics to the SAR.

At step 428, the SAR forwards the data packet to the SI. The SAR may receive the data packet from the host and determine an appropriate SI associated with the service indicated by the SA. The SI may be determined by one or more load balancing methods, including, but not limited to, round-robin, IP hash, least connections, least response time, least bandwidth, etc. The SAR may perform a second IP encapsulation on the data packet. In some examples, the SAR may compress the first IP encapsulation and/or the data packet associated with the first IP encapsulation and include the compressed IP encapsulation and/or the data packet in the second IP encapsulation. The SAR may compress the first IP encapsulation and/or the data packet in a manner that may be received by the service instance. Upon receipt of the compressed first IP encapsulation and/or the data packet, the SI may reconstruct and/or decompress the first IP encapsulation and/or the data packet. In some examples, the SAR may apply a security mechanism, encryption, and/or another security protocol to the first IP encapsulation and/or the data packet before performing the second IP encapsulation. The second IP encapsulation may include the original address directed to the SA and a new address directed to the SI selected by the SAR. This may be illustrated as follows: (SAR, SI) (H, SA) (payload). The SI may receive the data packet from the SAR. In some examples, the SI may decompress and/or reconstruct the first IP encapsulation and/or the data packet.

At step 430, the SI responds to the host with a second data packet. The SI may respond directly to the host, as opposed to routing the second data packet through the SAR. The SI may perform a third IP encapsulation and send the second data packet to the host, which may include the SA and the SI. This may be illustrated as follows: (SA, H) (SI, H) (payload). The host may receive the second data packet from the SI.

At step 432, the host learns the SI. Using the second data packet, the host may learn the SI. A shim layer may update the SA-to-SI mapping; and one or more subsequent service requests may be sent directly to the SI, in lieu of utilizing the SAR as an intermediary.

At step 434, the host sends subsequent requests to the SI instead of the SA. Subsequent requests may be formatted as follows: (H, SI) (payload). In some examples, the SI may be unable to receive one or more subsequent requests from the host (e.g., power failure, connectivity failure, cloud provider issues, etc.). The host may initiate a transaction with the SAR to identify a second SI to service the one or more subsequent requests.

At step 436, the SI responds to the host. The response to the host may be formatted as follows: (SI, H) (payload).

FIG. 5 illustrates an example flowchart for routing data packets to service instances using IP encapsulation according to aspects of the present disclosure. Although the example flowchart depicts a particular sequence of operations, the sequence may be altered without departing from the scope of the present disclosure. For example, some of the operations depicted may be performed in parallel or in a different sequence that does not materially affect the function of the routine depicted in the example flowchart. In other examples, different components of an example device or system that implements the routine depicted in the example flow chart may perform functions at substantially the same time or in a specific sequence.

In block 502, the system generates, at a device, a first request, the first request including a first data packet and a first IP encapsulation identifying the device and a service address of a service to be applied to the first data packet. The device may be any Internet-connected device capable of instantiating a service request, including, but not limited to, laptops, desktop computers, mobile devices, smartphones, IoT devices, printers, tablets, etc. The service address may be associated with a service stored on one or more cloud providers and/or data centers. The service may be accessible by one or more devices connected to the network. The first IP encapsulation may be IPv4 or IPv6 encapsulation.

The device may receive a command (e.g., from a network administrator, associated user, another device, etc.) to access the service. Alternatively, the service may be automatically applied to a given network traffic and the first data packet depending on the nature of a particular network traffic. The service may be an application at a network application layer that connects one or more users working in one or more locations to applications and data in a network. For example, the service may be a network security service, a firewall service, an intrusion detection service, and/or any other known or to be developed service within a given network. In some examples, the service may be accessible through a service instance. The service instance may be a single instantiation of the service that runs the workload. The service instance may be hosted on a cloud provider, private cloud, data center, etc. The one or more service instances may be associated with different IP addresses that the service address associated with the service.

In block 504, the system identifies a service aware router. In some examples, the service aware router may be known by the device in the network and the data packet may be directly send to the service aware router. In some examples, the first packet may not include IP encapsulation. In some examples, the network may identify the data packet and route the data packet to the service aware router. The data packet may be routed to the service aware router via a method of mapping that is responsive enough to deliver relevant metrics (e.g., border gateway protocol (BGP) and/ or another software-defined networking (SDN) method of mapping). In some examples, the device may learn the service aware router via an out-of-band-mechanism (e.g., DNS and/or DHCP). In this example, a shim layer maps, from the device, the service address to the service aware router via a service aware router learned out-of-band.

In block 506, the system transmits, by the device, the first request to the service aware router, wherein the service aware router generates a second request that includes the first data packet, the first IP encapsulation and a second IP encapsulation identifying the service aware router and a service instance of the service, and transmits the service request to the instance of the service. The device, the service aware router, and/or the service associated with the service address may be associated with a network. The network may be a public network or may be a private network associated with an enterprise, household, building, etc. The service aware router may receive the first request from the device. The service aware router may identify the service instance associated with the service associated with the first request. The service aware router may perform a second IP encapsulation and forward the data packet to the service instance. The service aware router may perform compression on the first IP encapsulation and/or the data packet and include the compressed first IP encapsulation and/or the data packet in the second IP encapsulation. The service aware router may apply a security mechanism and/or encryption to the first IP encapsulation and include the secured first IP encapsulation in the second IP encapsulation. The second IP encapsulation may be an IPv4 or an IPv6 encapsulation.

In block 508, the system receives, at the device and from the service instance of the service, a response including a second data packet and a third IP encapsulation, the third IP encapsulation including an identifier of the service instance of the service. The service instance may be one service instance of one or more service instances associated with the service address. The service instance may be hosted at one or more cloud providers. In some examples, the updated service address identifies the service instance to the device. The third IP encapsulation may be an IPv4 or an IPv6 encapsulation.

In block 510, the system records, at the device, the identifier of the service instance, wherein subsequent requests for applying the service to data packets originating at the device are directly transmitted by the device to the service instance using an IP encapsulation that includes the identifier of the service instance. When received by the device, the device may process the the second packet and a shim layer may update the service address-to-service instance mapping. In this manner, the device may forego the service aware router in future service requests. Subsequent requests may be directly sent to the service instance in lieu of being intercepted by the service aware router. The updated service address may correspond to the address of the service instance. The service instance may respond directly to the device in response to the second request and subsequent requests. The fourth IP encapsulation may be an IPv4 or an IPv6 encapsulation.

In some examples, connection between the device and the service instance may be interrupted (e.g., power outages, connection failures, cloud provider failures, etc.). In those instances, the device may instantiate a transaction with the service aware router to identify an alternative service instance. The first IP encapsulation may be an IPv4 or an IPv6 encapsulation.

Figure 6:
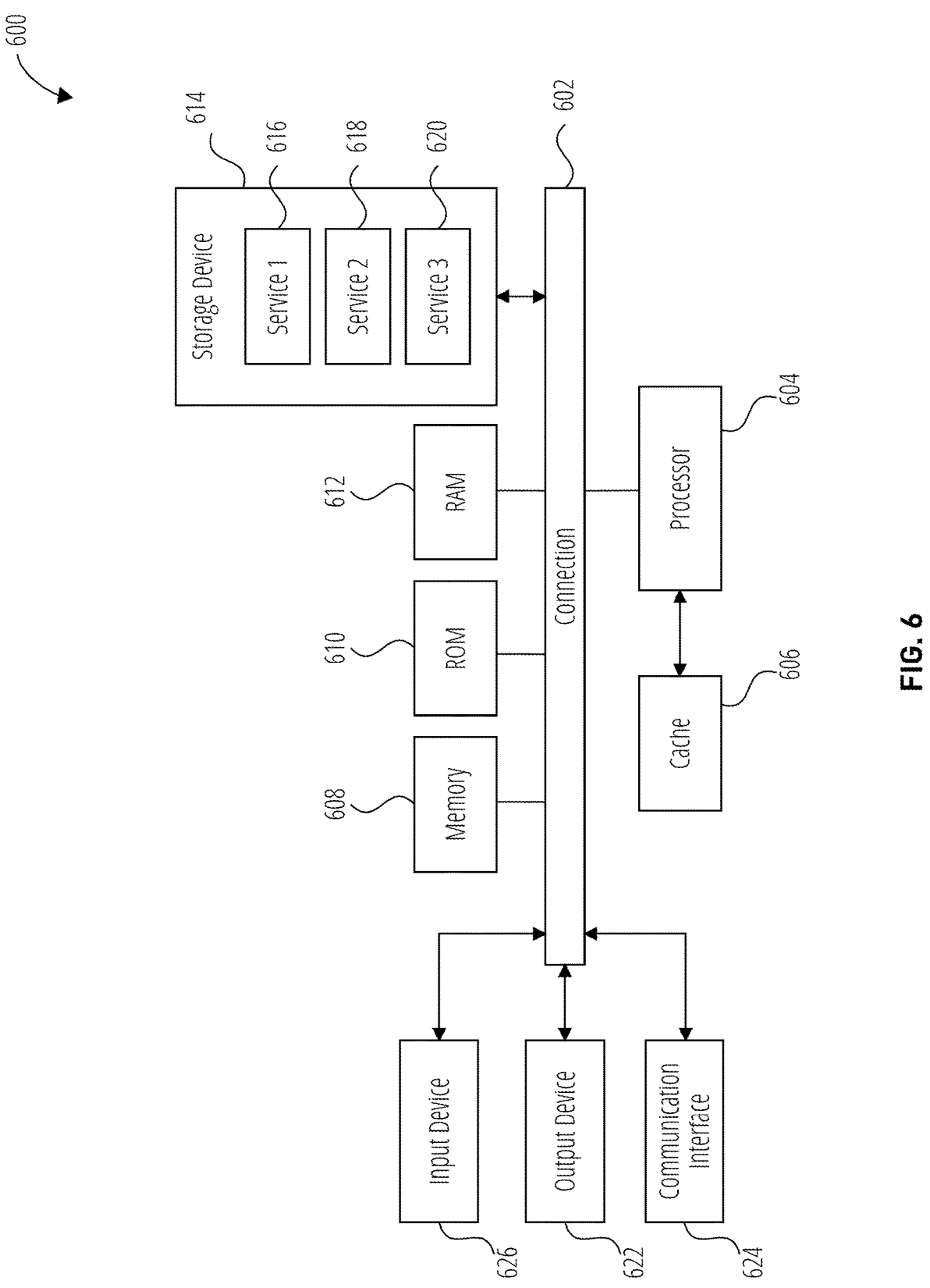
FIG. 6 shows an example computing system for routing data packets according to aspects of the present disclosure.

FIG. 6 shows an example of computing system 600, which can be for example any computing device making up the system for routing data packets to service instances using IP encapsulation or any component thereof, as described above with reference to FIGS. 1-5 (e.g., host 302, SAR 406, etc.), in which the components of the system are in communication with each other using connection 602. Connection 602 can be a physical connection via a bus, or a direct connection into processor 604, such as in a chipset architecture. Connection 602 can also be a virtual connection, networked connection, or logical connection.

In some embodiments, computing system 600 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 600 includes at least one processing unit (CPU or processor) 604 and connection 602 that couples various system components including system memory 608, read-only memory (ROM) 610 and random access memory (RAM) 612 to processor 604. Computing system 600 can include a cache of high-speed memory 606 connected directly with, in close proximity to, or integrated as part of processor 604.

Processor 604 can include any general purpose processor and a hardware service or software service, such as services 616, 618, and 620 stored in storage device 614, configured to control processor 604 as well as a special-purpose processor where software instructions are incorporated into the actual processor design. Processor 604 may essentially be a completely self-contained computing system, containing multiple cores or processors, a bus, memory controller, cache, etc. A multi-core processor may be symmetric or asymmetric.

To enable user interaction, computing system 600 includes an input device 626, which can represent any number of input mechanisms, such as a microphone for speech, a touch-sensitive screen for gesture or graphical input, keyboard, mouse, motion input, speech, etc. Computing system 600 can also include output device 622, which can be one or more of a number of output mechanisms known to those of skill in the art. In some instances, multimodal systems can enable a user to provide multiple types of input/output to communicate with computing system 600. Computing system 600 can include communication interface 624, which can generally govern and manage the user input and system output. There is no restriction on operating on any particular hardware arrangement, and therefore the basic features here may easily be substituted for improved hardware or firmware arrangements as they are developed.

Storage device 614 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 614 can include software services, servers, services, etc., that when the code that defines such software is executed by the processor 604, it causes the system to perform a function. In some embodiments, a hardware service that performs a particular function can include the software component stored in a computer-readable medium in connection with the necessary hardware components, such as processor 604, connection 602, output device 622, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

What is claimed is:

1. A computer-implemented method comprising:

generating, at a first endpoint, a first request, the first request including a first data packet and a first IP encapsulation identifying the first endpoint and a service address of a service to be applied to the first data packet, wherein upon the service being applied to the first data packet, the first data packet is routed back to the first endpoint or to a second endpoint, wherein the service resides in a datacenter in a network and the first endpoint is communicatively coupled to the datacenter;

transmitting, by the first endpoint, the first request to a service aware router, wherein the service aware router generates a second request that includes the first data packet and a second IP encapsulation identifying the service aware router and a service instance of the service, and transmits the second request to the service instance of the service, wherein the service aware router is communicatively coupled to the first endpoint and the datacenter;

receiving, at the first endpoint and from the service instance of the service, a response including a second data packet and a third IP encapsulation, the third IP encapsulation including an identifier of the service instance of the service; and recording, in a memory at the first endpoint, the identifier of the service instance, wherein subsequent requests for applying the service to data packets originating at the first endpoint are generated using a fourth IP encapsulation that includes the identifier of the service instance, and wherein the subsequent requests bypass the service aware router and are directly transmitted by the first endpoint to the service instance in the datacenter.

2. The computer-implemented method of claim 1, wherein the second request includes the first IP encapsulation compressed by the service aware router, whereby when received by the service instance, the service instance reconstructs the first IP encapsulation.

3. The computer-implemented method of claim 2, wherein the service aware router applies a security mechanism to the first IP encapsulation.

4. The computer-implemented method of claim 1, wherein the service aware router is identified via out-of-band signaling, and wherein a shim layer maps, at the first endpoint, the service address to the service aware router identified via the out-of-band signaling.

5. The computer-implemented method of claim 1, wherein any one of the first IP encapsulation, the second IP encapsulation, the third IP encapsulation, and the IP encapsulation of the subsequent requests can be one of an IPv4 encapsulation and an IPV6 encapsulation.

6. The computer-implemented method of claim 1, wherein the service instance is an instance of the service stored in a public or private cloud.

7. The computer-implemented method of claim 1, wherein a method of software-defined networking (SDN) mapping is used to implement a mechanism of service address to service instance mapping at the service aware router.

8. A device comprising:

one or more memories configured to store computer-readable instructions; and one or more processors configured to execute the computer-readable instructions to:

generate a first request, the first request including a first data packet and a first IP encapsulation identifying the device and a service address of a service to be applied to the first data packet, wherein upon the service being applied to the first data packet, the first data packet is routed back to the device or to another device, wherein the service resides in a datacenter in a network and the device is communicatively coupled to the datacenter;

transmit the first request to a service aware router, wherein the service aware router generates a second request that includes the first data packet and a second IP encapsulation identifying the service aware router and a service instance of the service, and transmits the second request to the service instance of the service, wherein the service aware router is communicatively coupled to the device and the datacenter;

receive, from the service instance of the service, a response including a second data packet and a third IP encapsulation, the third IP encapsulation including an identifier of the service instance of the service; and record, in a memory of the device, the identifier of the service instance, wherein subsequent requests for applying the service to data packets originating at the device are generated using a fourth IP encapsulation that includes the identifier of the service instance, and wherein the subsequent requests bypass the service aware router and are directly transmitted by the device to the service instance in the datacenter.

9. The device of claim 8, wherein the second request includes the first IP encapsulation compressed by the service aware router, whereby when received by the service instance, the service instance reconstructs the first IP encapsulation.

10. The device of claim 9, wherein the service aware router applies a security mechanism to the first IP encapsulation.

11. The device of claim 8, wherein the service aware router is identified via out-of-band signaling, and wherein a shim layer maps, at the device, the service address to the service aware router identified via the out-of-band signaling.

12. The device of claim 8, wherein any one of the first IP encapsulation, the second IP encapsulation, the third IP encapsulation, and the IP encapsulation of the subsequent requests can be one of an IPV4 encapsulation and an IPV6 encapsulation.

13. The device of claim 8, wherein the service instance is an instance of the service stored in a public or private cloud.

14. The device of claim 8, wherein the one or more processors are configured to execute the computer-readable instructions to utilize a method of software-defined
network (SDN) mapping to implement a mechanism of service address to service instance mapping at the service aware router.

15. One or more non-transitory computer-readable storage media comprising computer-readable instructions, which when executed by one or more processors of a device, causes the device to:
generate a first request, the first request including a first data packet and a first IP encapsulation identifying the device and a service address of a service to be applied to the first data packet, wherein upon the service being applied to the first data packet, the first data packet is routed back to the device or to a different device wherein the service resides in a datacenter in a network and the device is communicatively coupled to the datacenter;
transmit the first request to a service aware router, wherein the service aware router generates a second request that includes the first data packet and a second IP encapsulation identifying the service aware router and a service instance of the service, and transmits the second request to the service instance of the service, wherein the service aware router is communicatively coupled to the device and the datacenter;
receive, from the service instance of the service, a response including a second data packet and a third IP encapsulation, the third IP encapsulation including an identifier of the service instance of the service; and
record, in a memory of the device, the identifier of the service instance, wherein subsequent requests for applying the service to data packets originating at the device are generated using a fourth IP encapsulation that includes the identifier of the service instance, and wherein the subsequent requests bypass the service aware router and are directly transmitted by the device to the service instance in the datacenter.

16. The one or more non-transitory computer-readable media of claim 15, wherein the second request includes the first IP encapsulation compressed by the service aware router, whereby when received by the service instance, the service instance reconstructs the first IP encapsulation.

17. The one or more non-transitory computer-readable media of claim 16, wherein the service aware router applies a security mechanism to the first IP encapsulation.

18. The one or more non-transitory computer-readable media of claim 15, wherein the service aware router is identified via out-of-band signaling, and wherein a shim layer maps, at the device, the service address to the service aware router identified via the out-of-band signaling.

19. The one or more non-transitory computer-readable media of claim 15, wherein any one of the first IP encapsulation, the second IP encapsulation, the third IP encapsulation, and the IP encapsulation of the subsequent requests can be one of an IPV4 encapsulation and an IPV6 encapsulation.

20. The one or more non-transitory computer-readable media of claim 15, wherein the execution of the computer-readable instructions further cause the device to utilize a method of software-defined network (SDN) mapping to implement a mechanism of service address to service instance mapping at the service aware router.

* * * * *